United States Patent
Yamasaki et al.

(10) Patent No.: US 7,448,464 B2
(45) Date of Patent: Nov. 11, 2008

(54) STEER-BY-WIRE SYSTEM (75) Inventors: Tatsuya Yamasaki, Iwata (JP); Takehito Sakurai, Iwata (JP)

(73) Assignee: NTN Corporation, Osaka (JP)

( * ) Notice: Subject to any disclaimer, the term of this patent is extended or adjusted under 35 U.S.C. 154(b) by 283 days.

(21) Appl. No.: 11/077,357

(22) Filed: Mar. 11, 2005

(65) Prior Publication Data
US 2005/0205336 A1 Sep. 22, 2005

(30) Foreign Application Priority Data
Mar. 17, 2004 (JP) .............................. 2004-076615

(51) Int. Cl.
*B62D 5/00* (2006.01)
(52) U.S. Cl. .................. 180/402; 180/407; 180/444; 180/443; 180/403
(58) Field of Classification Search ............... 180/402, 180/407, 444, 443, 403
See application file for complete search history.

(56) References Cited
U.S. PATENT DOCUMENTS
6,231,448 B1 *  5/2001  Abe et al. ..................... 464/46
6,442,462 B1 *  8/2002  Nishizaki et al. ............... 701/41
6,705,424 B2 *  3/2004  Ogawa et al. ................. 180/446
6,817,457 B2 * 11/2004  Monahan et al. .............. 192/38
2004/0182670 A1 *  9/2004  Nojiri et al. .................. 192/38
2005/0155809 A1 *  7/2005  Krzesicki et al. ............. 180/407

FOREIGN PATENT DOCUMENTS
EP      0 447 626 A2    9/1991
JP      2003-90356 A    3/2003

* cited by examiner

Primary Examiner—Lesley D. Morris
Assistant Examiner—Marlon A Arce Diaz
(74) Attorney, Agent, or Firm—Arent Fox LLP (57) ABSTRACT A clutch (10) is a fail-safe mechanism for a steer-by-wire system (100) which, when a defective condition occurs in the steer-by-wire system (100), places the clutch (10) in the engaged state and makes it possible to steer directly by a steering wheel (2) instead of by the steer-by-wire system (100). The clutch (10) is composed of a mechanical clutch section (11, 12, 13, 14), and a solenoid coil (17) for controlling the mechanical clutch section, and is a reverse actuation type clutch such that when the solenoid coil (17) is in the energized state, the mechanical clutch section is in the disengaged state, while when the solenoid coil (17) is in the de-energized state, the mechanical clutch section is in the engaged state.

8 Claims, 14 Drawing Sheets

STEER-BY-WIRE SYSTEM

BACKGROUND OF THE INVENTION a. Field of the Invention

This invention relates to a steer-by-wire system, and more particularly it relates to a fail-safe mechanism for steer-by-wire systems, so designed that when a defective condition develops in a steer-by-wire system, a shaft connected directly to the steering wheel is connected to a shaft connected to the steering gear, so as to make direct steering by the steering wheel possible.

b. Related Technology

Steer-by-wire systems replace a system in which the steering wheel and the steering gear of an automobile are not mechanically connected, and are adapted to control the steer angle by rotating a motor through electric signals. Since steer-by-wire systems, which dispense with steering shaft and the like for connecting the steering wheel and steering gear, increase the degree of freedom of car interior layout and allow automatic control of road wheel steer angle according to the vehicle speed; thus, steer-by-wire systems are expected to improve safety travel and motion performance of vehicles.

Figure 14:
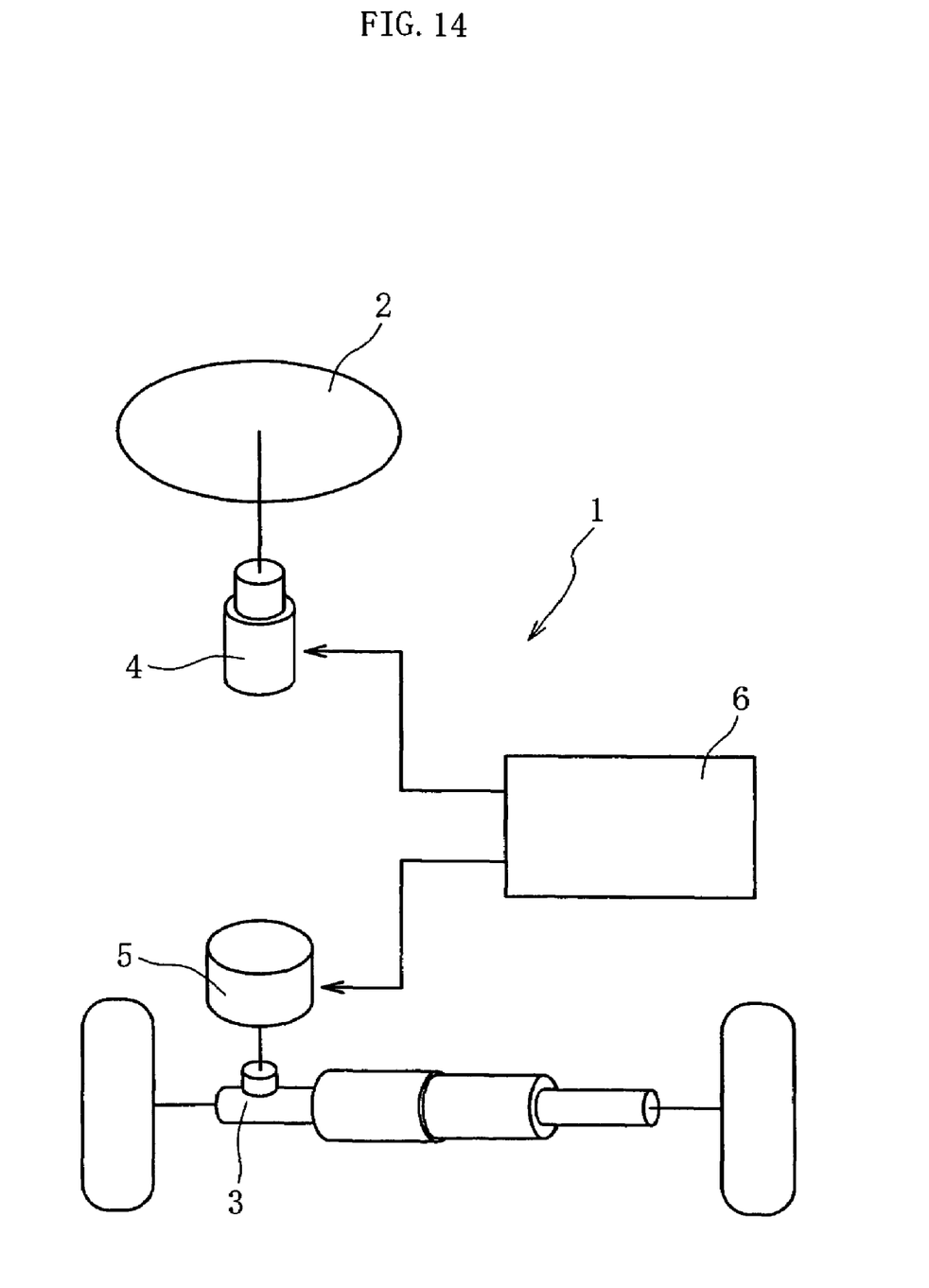
FIG. 14 is a schematic view of a steer-by-wire system showing the prior art.

FIG. 14 schematically illustrates a steer-by-wire system 1. A steering wheel 2 and a steering gear 3 are not mechanically connected, and instead the steer angle of the steering gear 3 is operated through a steer actuator 5 controlled by a controller 6 according to the steer angle of the steering wheel 2, and a reaction simulator 4 imparts a steer reaction controlled by the controller 6 to the steering wheel 2.

In the steer-by-wire system in which the steering wheel 2 and the steering gear 3 are not mechanically connected in this manner, if a defective condition should develop in the steer actuator 5 or reaction simulator 4, a defective condition would develop in the control of the vehicle by steering. Thus, Japanese Patent Application Laid-Open under No. 2001-301639 discloses a fail-safe mechanism therefor, in which the steering wheel and the steering gear are connected by a solenoid clutch to allow direct steering by the steering wheel.

In the steer-by-wire system disclosed in Japanese Patent Application Laid-Open under No. 2001-301639, since a solenoid clutch is used, it follows that when supply of electric power is cut off as by a fault in the electric system, the solenoid clutch cannot be switched, thus making it impossible to connect the steering wheel and the steering gear. Further, since the solenoid clutch is a friction transmission type clutch, more or less electric power supply capability is required and moreover it is difficult to make the whole system compact. Further, a friction transmission type clutch, such as a solenoid clutch, has the demerit of drag torque during dragging being high.

SUMMARY OF THE INVENTION

An object of the invention is to provide a steer-by-wire system adapted to be less influenced by a failure in the electric system, to reduce power consumption, to be compacted in size as a whole, and to reduce the drag torque during dragging.

A steer-by-wire system of the invention comprises a first shaft connected to a steering wheel, a first motor imparting a steer reaction to the first shaft, a second shaft connected to a steering gear, a second motor for imparting steer force to the second shaft, and a clutch installed between the first and second shafts for switching the first and second shafts between a connected position and a non-connected position, the arrangement being such that normally said clutch is held in the disengaged state and steering is effected by the first motor imparting a steer reaction to the first shaft and the second motor imparting a steer force to the second shaft, wherein the clutch 10 is composed of a mechanical clutch section, and a solenoid coil controlling said mechanical clutch section, and is a reverse actuation type clutch such that when the solenoid coil is in the energized state, the mechanical clutch section is in the disengaged state, while when the solenoid coil is in the de-energized state, the mechanical clutch section is in the engaged state.

The clutch may have the following elements:

an inner ring connected to either one of the first and second shafts, and an outer ring connected to the other, wedge spaces defined by cam surfaces formed on either one of the inner and outer rings and a cylindrical surface formed on the other, a cage elastically held to a member formed with the cam surfaces in the direction of rotation, engaging elements interposed between the inner and outer rings and held by the cage, an armature movable only axially of the cage, a switching plate movable only axially of the member formed with the cylindrical surface, a rotor fixed to the member formed with the cylindrical surface and opposed to the switching plate, an elastic member for pushing the switching plate away from the rotor and toward the armature, and a solenoid coil which, when energized, moves the switching plate toward the rotor against the elastic member.

In this case, when the solenoid coil is energized, a clearance is formed between the armature and the switching plate, placing the mechanical clutch section in the disengaged state. When the solenoid coil is de-energized, the armature and the switching plate are brought into frictional contact with each other by the action of the elastic member, placing the mechanical clutch section in the engaged state.

Further, the clutch may have the following element:

an inner ring connected to either one of the first and second shafts, and an outer ring connected to the other, wedge spaces defined by cam surfaces formed on either one of the inner and outer rings and a cylindrical surface formed on the other, a cage elastically held to a member formed with the cam surfaces in the direction of rotation, engaging elements interposed between the inner and outer rings and held by the cage, an armature movable only axially of the cage, a rotor fixed to the member formed with the cylindrical surface and opposed to the armature, an elastic member for pushing the armature away from the rotor, a slit formed in the surface of the rotor opposed to the armature, a permanent magnet and a solenoid coil which are fixed in the slit and move the armature to the rotor by their magnetic fluxes against the elastic member.

In this case, when the solenoid coil is energized, the attraction force on the armature decreases, the armature is separated from the rotor by the action of the elastic member, and the mechanical clutch section is placed in the disengaged state. When the solenoid coil is de-energized, the magnetic flux generated from the permanent magnet attracts the armature to the rotor against the elastic member, the armature and rotor are frictionally contacted with each other to place the mechanical clutch section in the engaged state.

The steer-by-wire system of the invention comprises a mechanical clutch disposed between inner and outer rings, with engaging elements for engagement, and a solenoid coil, the arrangement being such that when the solenoid coil is energized, the mechanical clutch section is placed in the disengaged state, while when the solenoid coil is de-energized, the mechanical clutch section is placed in the engaged state. Therefore, the mechanical clutch section which works as a practical fail-safe mechanism can be easily controlled by controlling the energized state of the solenoid coil, and since the mechanical clutch section is engaged when the solenoid coil is de-energized, it is possible to prevent occurrence of steer incapability due to a defective condition of the electric system, thus improving the safety of the steer-by-wire system.

The solenoid coil is used to control the engaged state of the mechanical clutch section, and it is possible to reduce the power consumption as compared with the solenoid clutch which directly transmits power.

Further, the portion which makes the steering wheel and the steering gear engaged or disengaged is the mechanical clutch section, and since the mechanical clutch section has a large allowable transmission torque as compared with friction type clutches including solenoid clutches, the clutch section can be compacted in size.

Further, as compared with friction type clutches such as solenoid clutches or wet type multiple disk clutches, it reduces the drag torque during dragging, and hence the energy loss is small. Embodiments of the invention will now be described with reference to the drawing.

Figure 1:
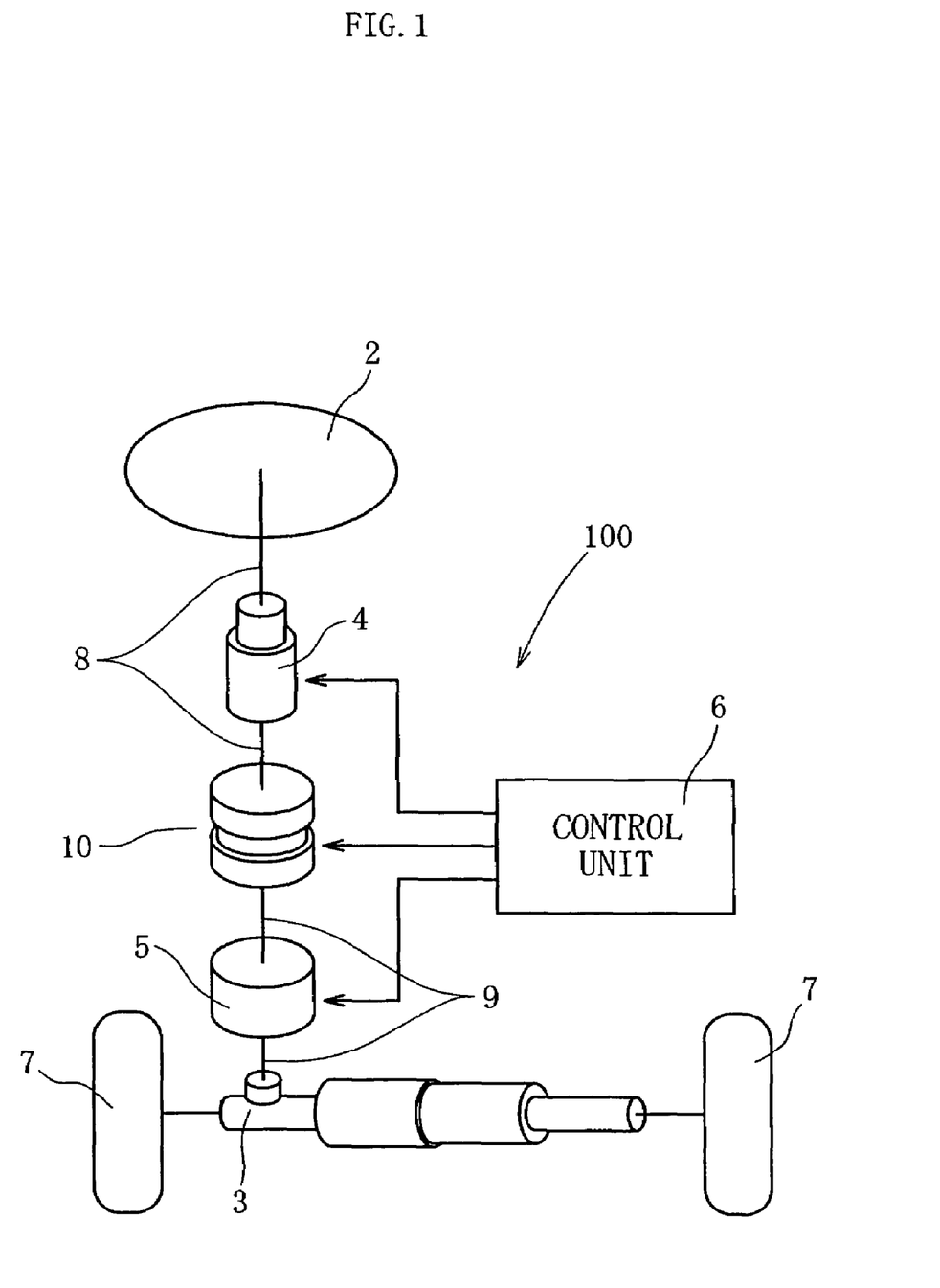
FIG. 1 is schematic view of a steer-by-wire system showing an embodiment of the invention.

Here, FIG. 1 shows the entire arrangement of a steer-by-wire system 1, and FIGS. 2-7 show a first embodiment, and FIGS. 8-13 show a second embodiment.

First, referring to FIG. 1, the entire arrangement of the steer-by-wire system will be described. A steering wheel 2 and a steering gear 3 are not mechanically connected and instead it is arranged that the steer angle of the steering gear 3 is operated through a steer actuator 5 controlled by a controller 6 according to the steer angle of the steering wheel 2, and a steer reaction controlled by the controller 6 is imparted to the steering wheel 2 by a reaction simulator 4. This is basically the same as in the prior art in FIG. 14. In addition, the reference character 7 denotes road wheels. Attached to a first shaft 8 directly connected to the steering wheel 2 is a first motor 4 for transmitting the steer reaction to the first shaft 8. Attached to a second shaft 9 directly connected to the steering gear 3 is a second motor 5 for transmitting a steer force to the second shaft 9. A clutch 10 is disposed between the first and second shafts 8 and 9. The clutch 10 is of such construction that it is switched to connect or disconnect the first and second shafts 8 and 9, thus constituting a fail-safe mechanism for the steer-by-wire system 1. That is, if a defective condition occurs in the steer-by-wire system 1, the clutch 10 is placed in the engaged state to allow direct steer by the steering wheel 2.

The clutch 10 is a mechanical clutch in which engaging elements disposed between the inner and outer rings engage each other to establish an engaged state, and is of such construction that when the solenoid coil is energized, the mechanical clutch is placed in the disengaged state, while when the solenoid coil is de-energized, the mechanical clutch is placed in the engaged state. The concrete arrangement of the clutch 10 is as follows.

Figure 2:
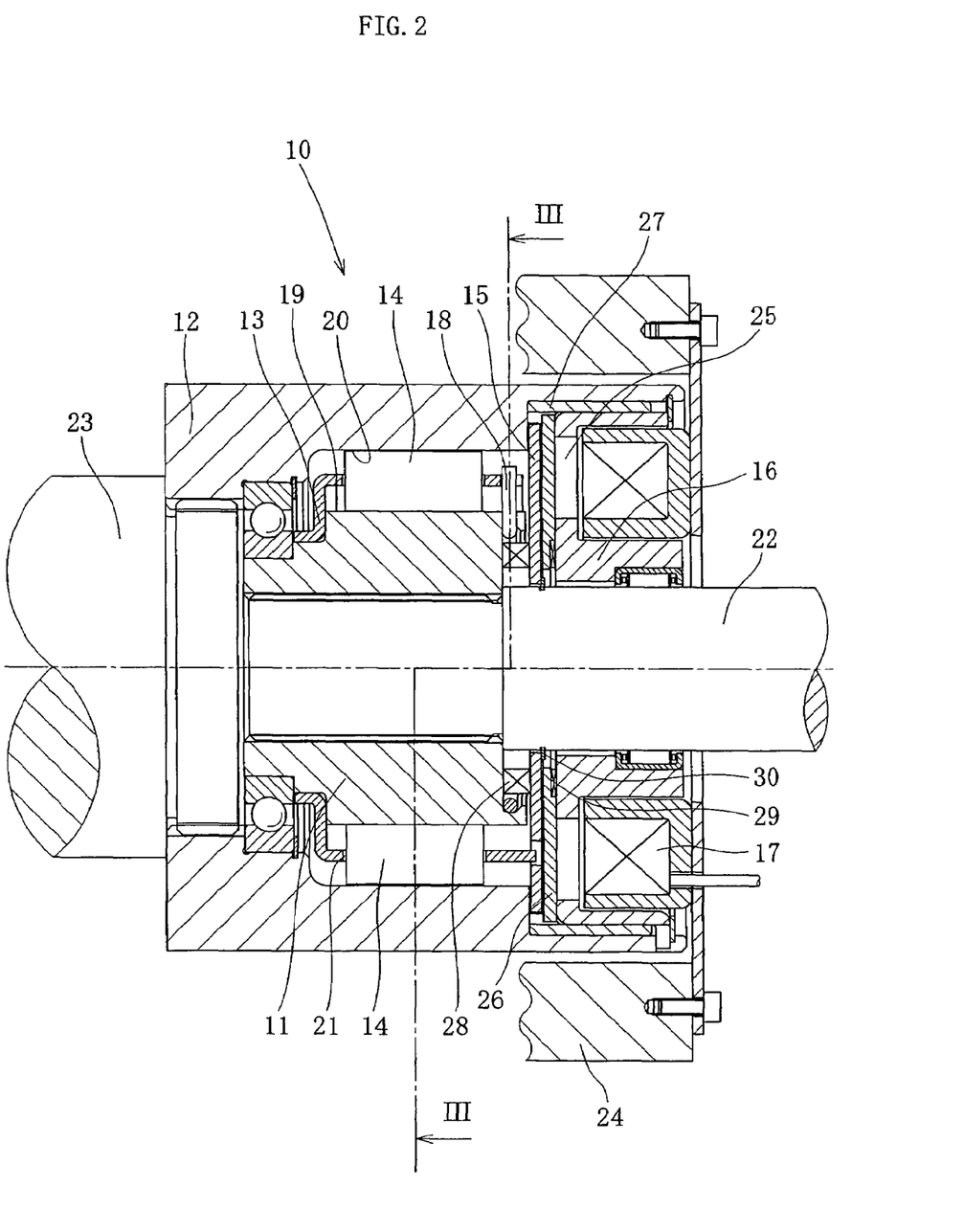
FIG. 2 is a longitudinal sectional view of a clutch portion showing a first embodiment.
Figure 4:
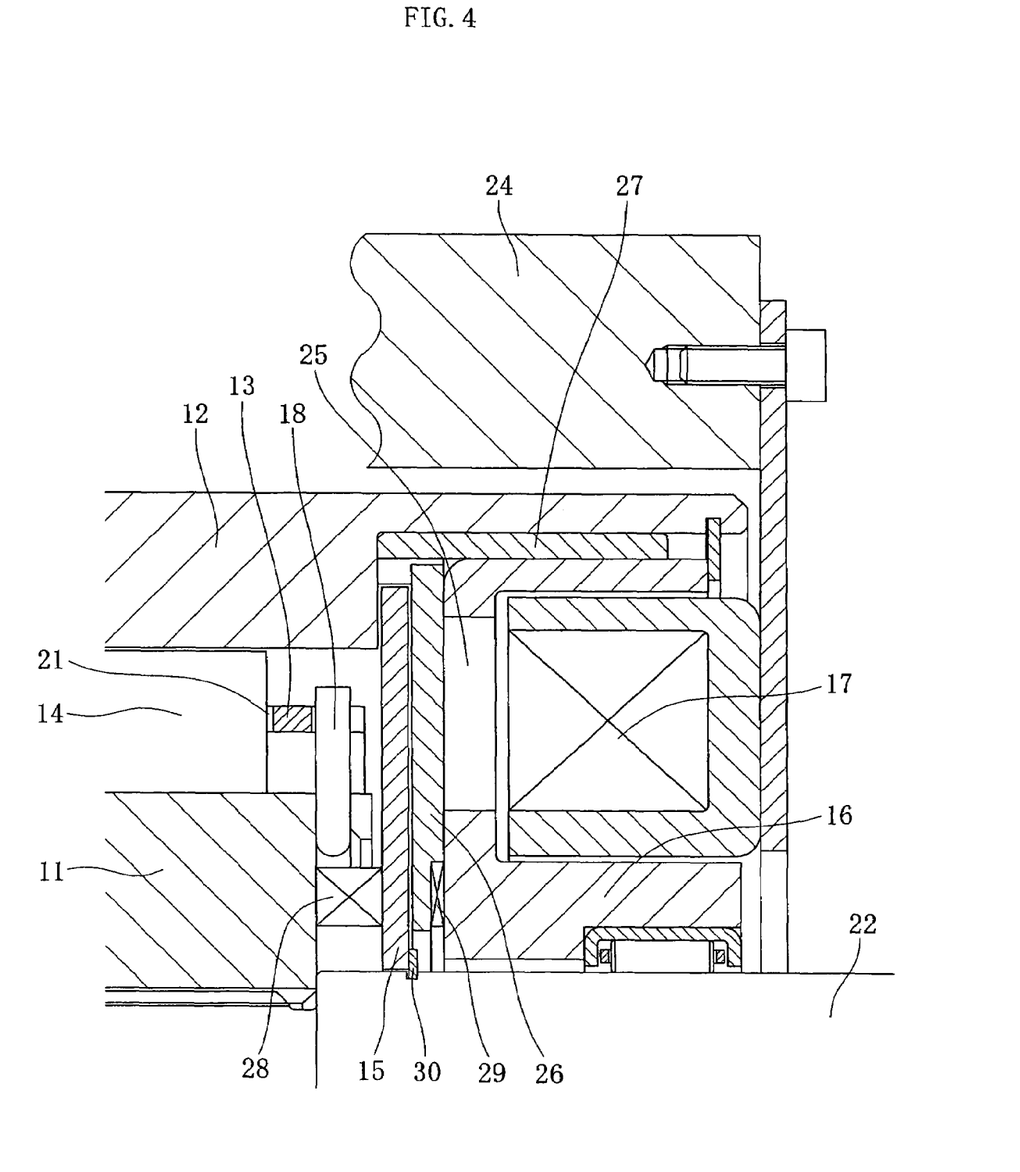
FIG. 4 is the principal enlarged view of FIG. 2.

The clutch 10, as shown in FIGS. 2 and 4, has an inner ring 11 and an outer ring 12 which are supported for relative rotation The inner peripheral surface of the outer ring 12 is a cylindrical surface 20, and the outer peripheral surface of the inner ring 11 is formed with cam surfaces 19 which cooperate with the cylindrical surface 20 of the outer ring 12 to define wedge spaces therebetween. Interposed between the cam surface 19 of the inner ring 11 and the cylindrical surface 20 of the outer ring 12 is a cage 13 held for rotation relative to the inner ring 11. The cage 13 has the same number of pockets 21 as the number of cam surfaces 19 in the inner ring 11, with a roller 14 incorporated in each pocket 21.

Figure 3:
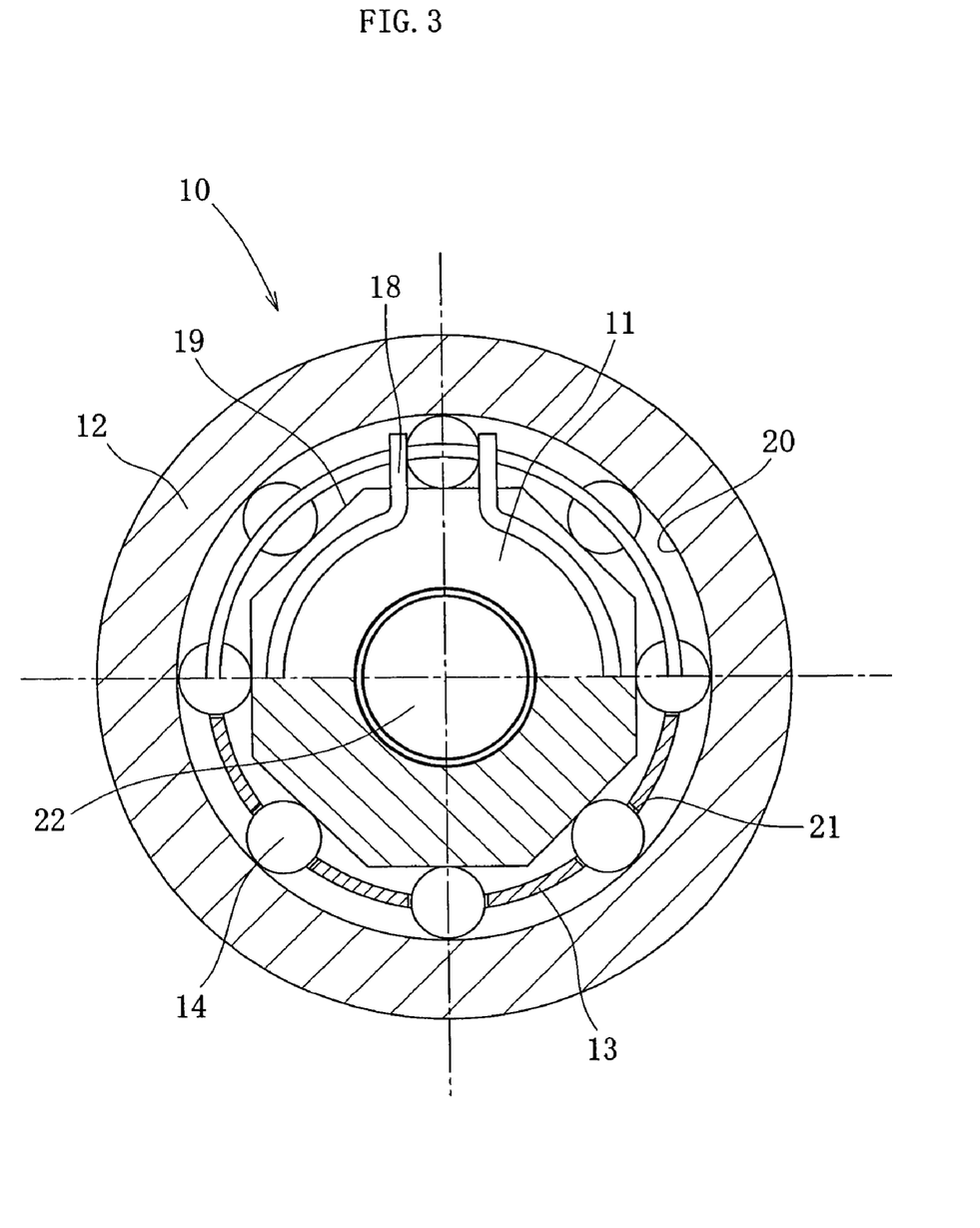
FIG. 3 is a sectional view taken along the line III-III in FIG. 2.
Figure 6:
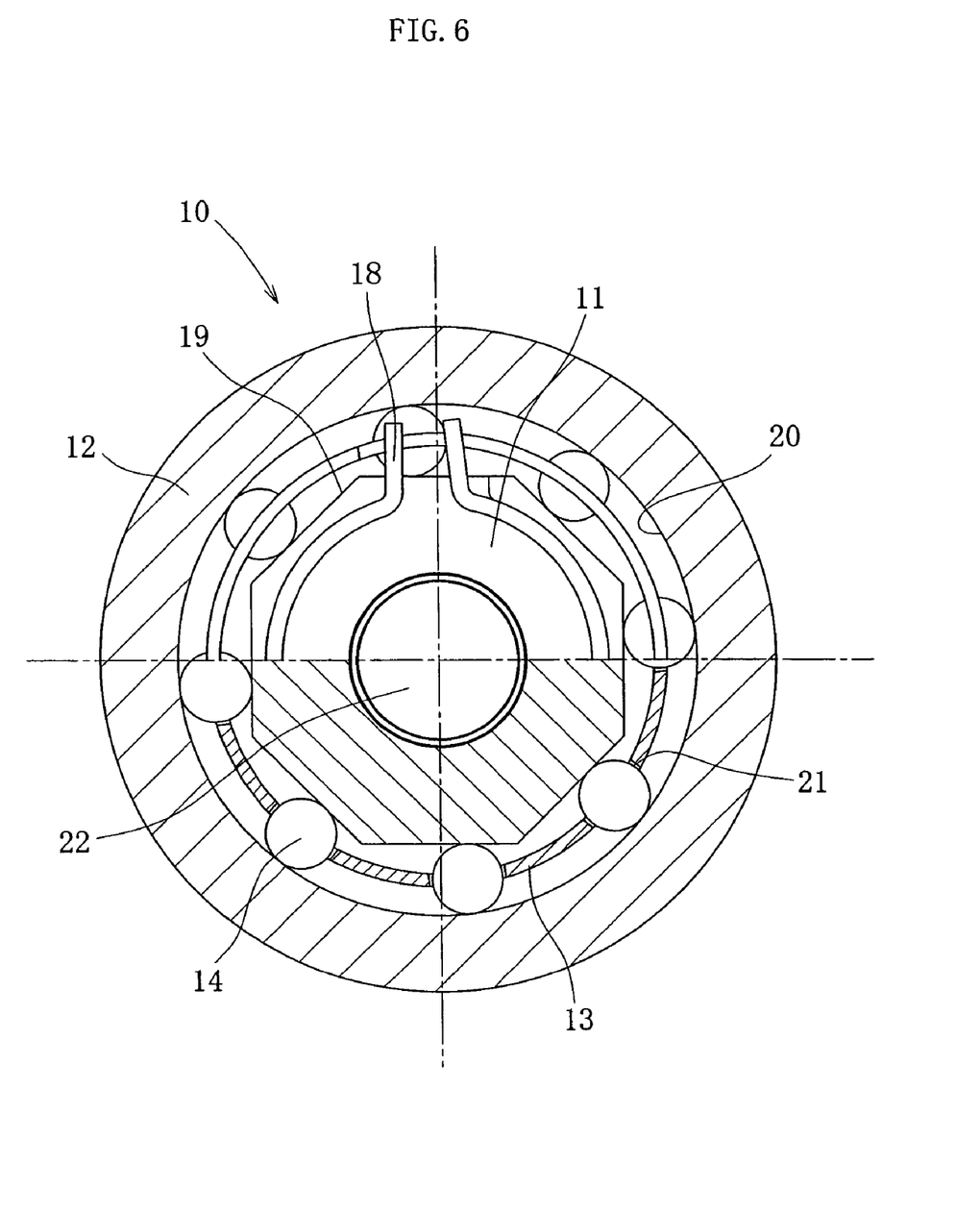
FIG. 6 is sectional view taken along the line VI-VI in FIG. 5.
Figure 7:
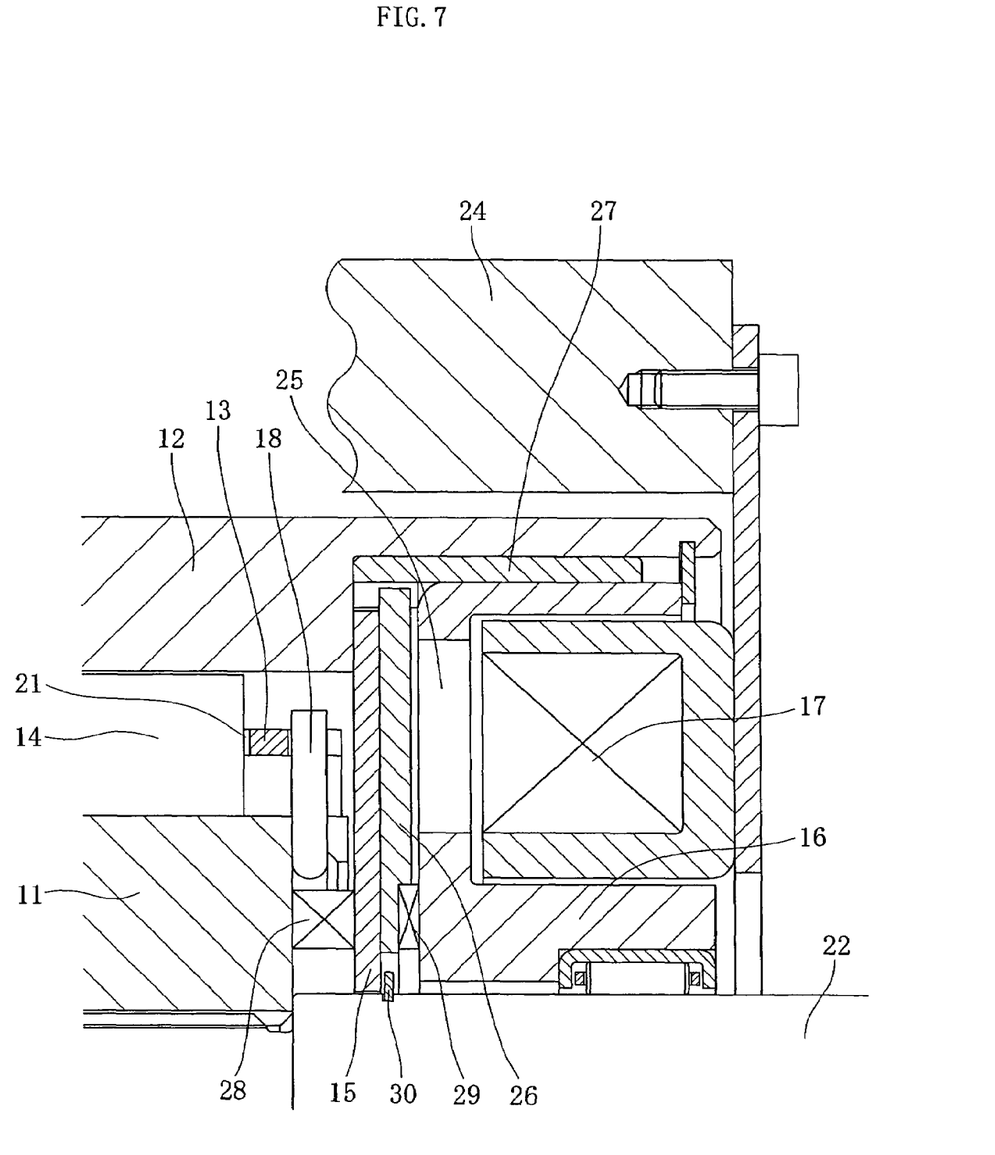
FIG. 7 is the principal enlarged view of FIG. 5.

As shown in FIG. 3, the cage 13 is elastically supported circumferentially by a switch spring 18. The switch spring 18 consists of an annular section and a pair of substantially radially extending engaging sections. The annular section is mounted in a peripheral groove formed in the end of the inner ring 11, while the engaging sections project outward through holes extending radially of the inner ring 11 to engage notches in the cage 13. The cage 13 is usually held in a neutral position (FIG. 3) where the rollers 14 do not simultaneously contact the cam surface 19 of the inner ring 11 and the cylindrical surface 20 of the outer ring 12. Therefore, the inner and outer rings 11 and 12 are in a relatively rotatable state. As shown in FIG. 6, when the rollers 14 are moved by a predetermined amount as the cage 13 is rotated, the rollers 14 cut into the wedge spaces defined between the cam surfaces 19 of the inner ring 11 and the cylindrical surface 20 of the outer ring 12, thereby integrating the inner and outer rings 11 and 12.

The inner ring 11 is serration- or spline-joined, for torque transmission, to a first rotary shaft 22 connected to either one of the first and second shafts 8 and 9 of the steer-by-wire system 100. The outer ring 12 is serration- or spline-joined, for torque transmission, to a second rotary shaft 23 connected to the other of the first and second shafts 8 and 9 of the steer-by-wire system 100. Therefore, the connected or disconnected state of the first and second shafts 8 and 9 of the steer-by-wire system 100 can be determined by controlling the engaged or disengaged state of the clutch 10.

The basic construction of the mechanical clutch portion described above is common to the first and second embodiments to be described below. These embodiments differ in the means for controlling the engaged and disengaged states of the mechanical clutch. A detailed description thereof will be given below.

A first embodiment shown in FIGS. 2-7 will be described. A rotor 16 is attached to the rotary shaft 22. The rotor 16, in this case, is supported through a roller bearing, and the rotary shaft 22 and the rotor 16 are relatively rotatable. The rotor 16 is fitted to the outer ring 12 through a rotor guide 27 made of nonmagnetic material. One end of the rotor 16 is formed with a radially outwardly bent projection, which is inserted into a notch in the outer ring 12 to serve as a whirl-stop for both. Interposed between the rotor 16 and the outer ring 12 are an armature 15 and a switching plate 26. The armature 15 is in such a relation that it is not movable relative to the cage 13 except axially. That is, a portion of the cage 13 which extends axially is inserted into a through hole in the armature 15, whereby the armature 15 and the cage 13 are not relatively rotatable but are relatively movable only axially. Interposed between the armature 15 and the end surface of the inner ring 11 is an elastic member 28 for urging the armature 15 against the switching plate 26. The movement of the armature 15 to the switching plate 26 is restricted by a stop ring 30 mounted on the rotary shaft 22. An elastic member 29 is interposed between the switching plate 26 and the rotor 16. The switching plate 26, rotor 16 and rotor guide 27 are in such a relation that they are relatively movable only axially. That is, the switching plate 26 has a radial projection, which is engaged in an axial groove formed in the inner peripheral surface of the rotor guide 27. The rotor 16 has a recess for receiving the solenoid coil 17 and is provided with a slit 25 axially extending therethrough from the recess to the switching plate 26. The solenoid coil 17 is fixed to the case 24 which belongs to the stationary system. There is a clearance between the rotor 16 and the solenoid coil 17, and both are relatively rotatable.

FIGS. 2 and 4 show the solenoid coil 17 in the energized state. That is, when the solenoid coil 17 is energized, the switching plate 26 is attracted to the rotor 16. At this time, by the action of the elastic member 28, the armature 15 is moved to a position where it contacts the stop ring 30. The stop ring 30 plays the role of preventing the armature 15 from contacting the switching plate 26 when the latter is attracted to the rotor 16. This ensures that the armature 15 does not contact the outer ring 12 (or the member deprived of freedom of rotation relative to the outer ring 12), that the rollers 14 are held in the neutral position by the action of the switch spring 18 (FIG. 3), and that the inner and outer rings 11 and 12 maintain the disconnected state.

Figure 5:
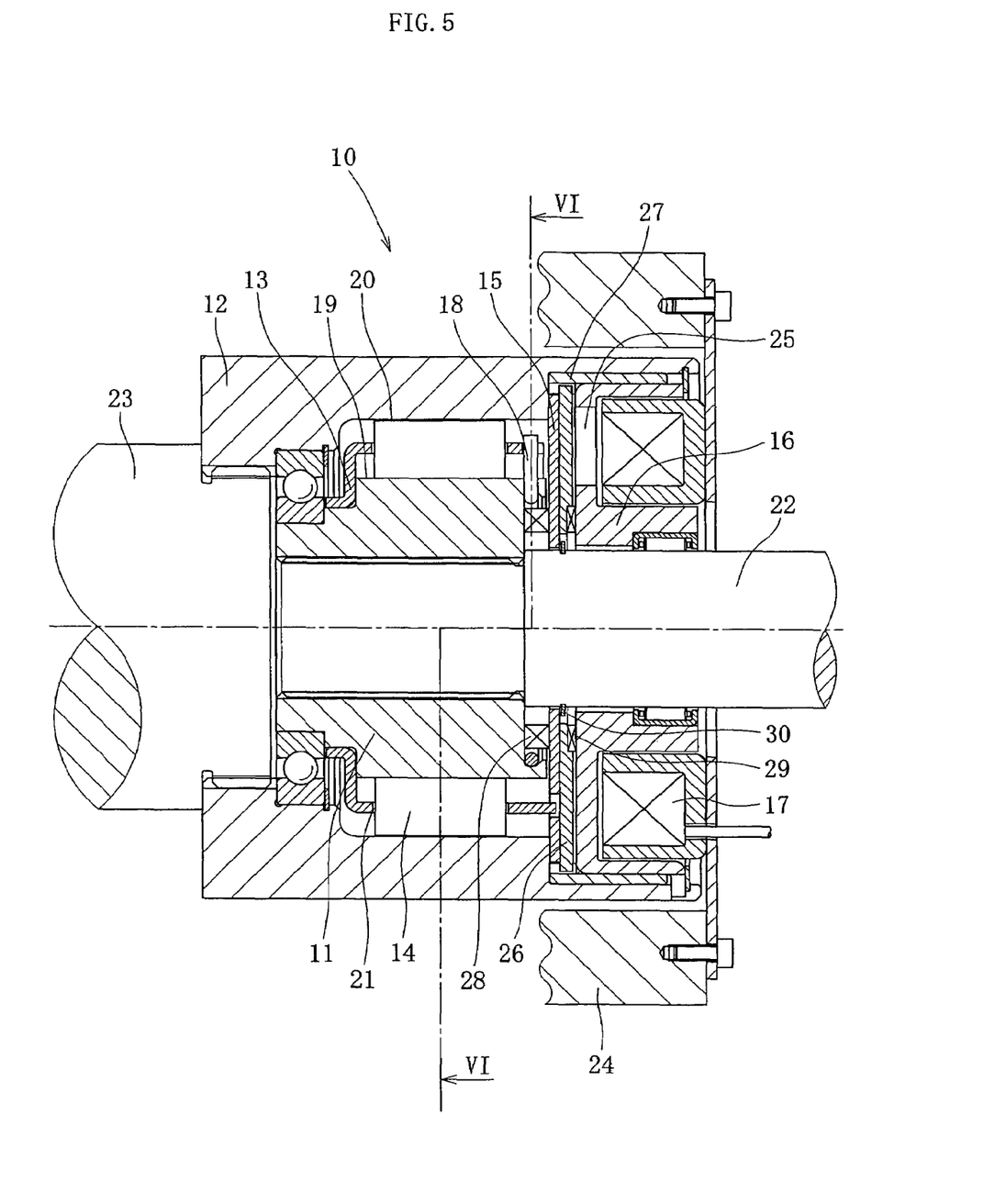
FIG. 5 is a longitudinal sectional view similar to FIG. 2, but showing a state during clutch operation.

FIGS. 5 and 6 show the solenoid coil 17 in the de-energized state. In this state, by the action of the elastic member 29, the switching plate 26 is separated from the rotor 16 and is in frictional contact with the armature 15. Here, when the inner and outer rings 11 and 12 are relatively rotated, the rollers 14 are moved to cut into the wedge spaces against the elastic force of the switch spring 17 to establish the connected state of the inner and outer rings 11 and 12. Here, if setting is made such that the pressing force $F_{29}$ of the elastic member 29 is greater than the pressing force $F_{28}$ of the elastic member 28 and the armature 15 is pressed to the outer ring 12 for frictional contact therewith, it is possible to increase the friction area to require a smaller force in switching from the disconnected to connected state. Further, making the armature 15 of nonmagnetic material makes it less vulnerable to the influence of magnetic flux generated when the solenoid coil 17 is energized, thus stabilizing operability.

A second embodiment will now be described with reference to FIGS. 8 through 13. This embodiment abolishes the switching plate 26 used in the first embodiment described above and adds a permanent magnet 34. Substantially the same parts and regions as those in the first embodiment are denoted by the same reference characters and a repetitive description thereof is omitted.

Figure 8:
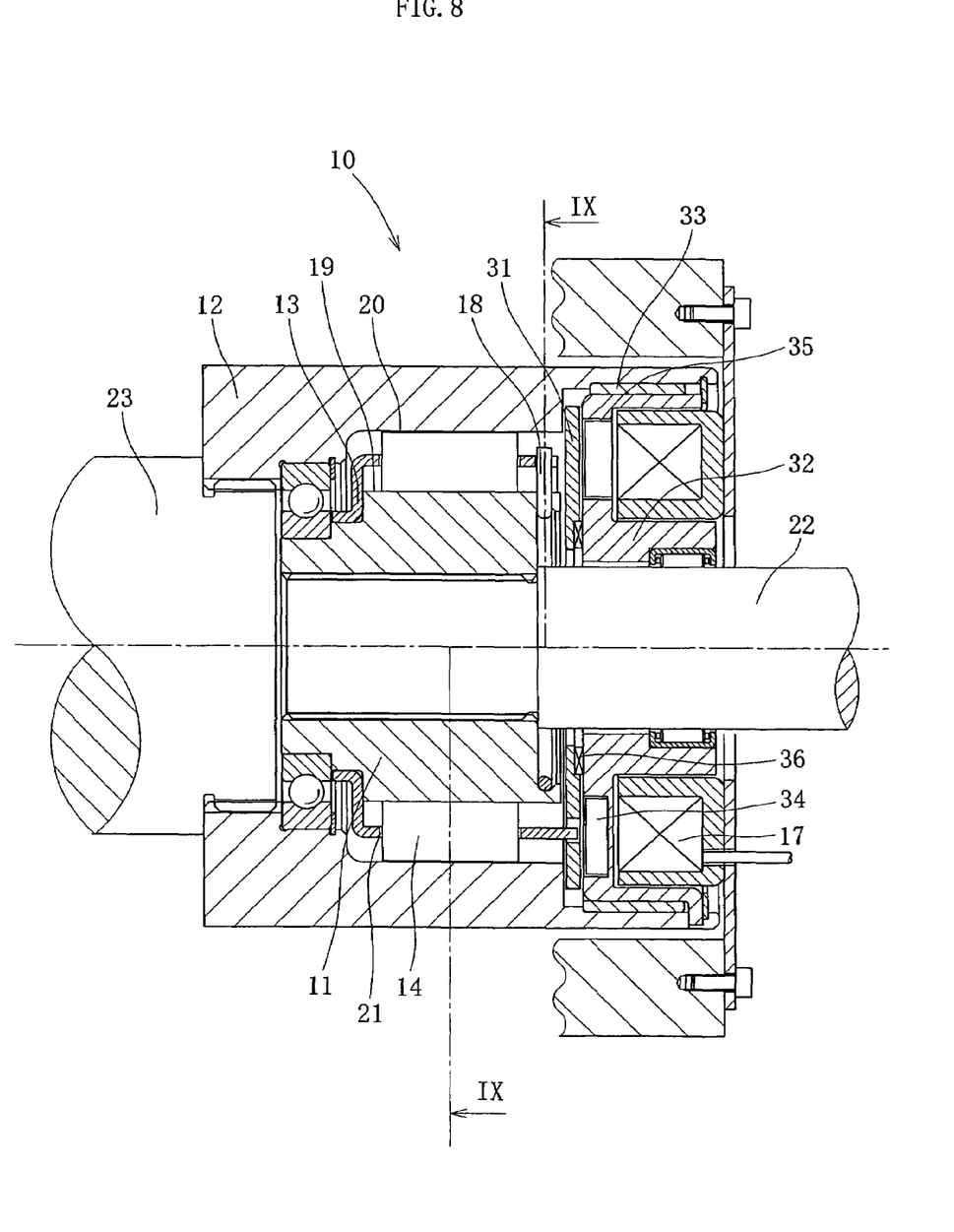
FIG. 8 is a longitudinal sectional view of a clutch portion showing a second embodiment.
Figure 9:
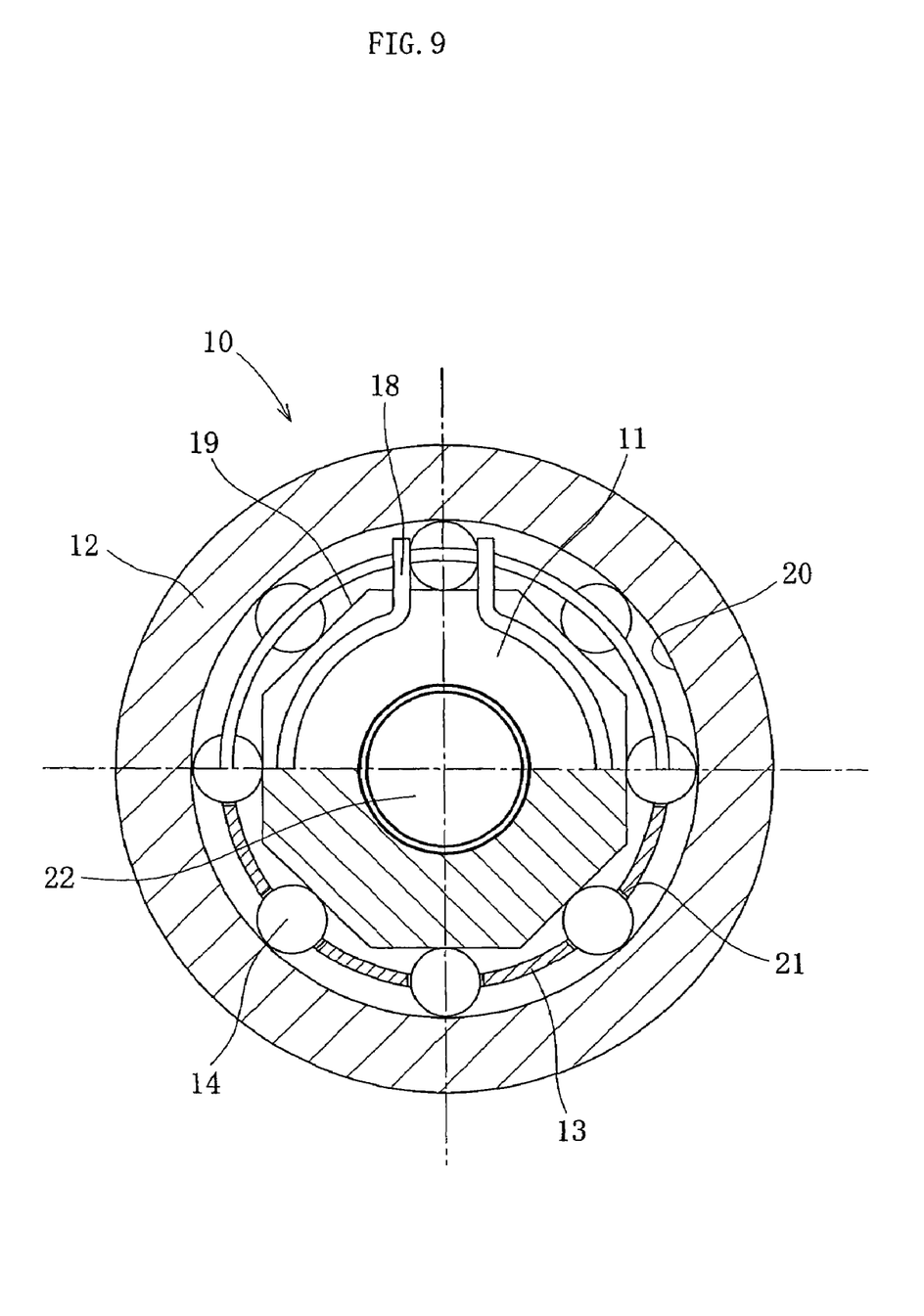
FIG. 9 is a sectional view taken along the line IX-IX in FIG. 8.
Figure 10:
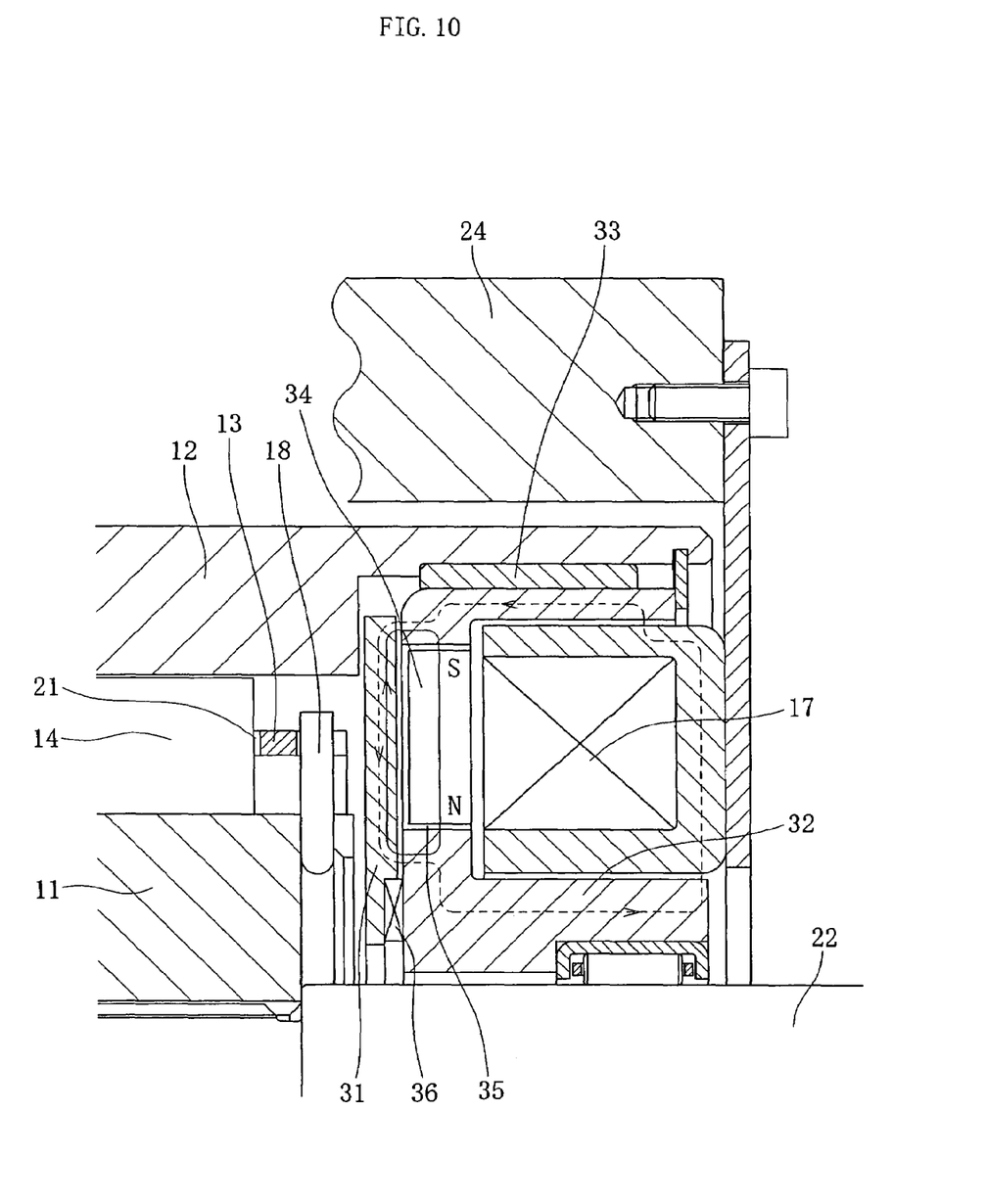
FIG. 10 is the principal enlarged view of FIG. 8.

FIGS. 8, 9 and 10 show the disconnected state. As shown in FIG. 8, an armature 31 made of magnetic material is in such a relation that it is movable relative to the cage 13 only axially, as in the case of the armature 15 in the first embodiment. A rotor 32 together with a rotor guide 33 of nonmagnetic material is fixed to the outer ring 12, such that the rotor 32 is opposed to the armature 31. The rotor 32 has a slit 35 extending therethrough from a recess receiving the solenoid coil 17 to the armature 31, with the permanent magnet 34 fixed in said slit 35. Here, when the solenoid coil 17 is energized, as shown in broken lines in FIG. 10, the magnetic flux of the solenoid coil 17 is produced in a direction opposite to the magnetic flux (solid line arrow) of the permanent magnet 34 passing through the armature 31. As a result, the attractive force due to the magnetic flux of the armature 31 is cancelled, the armature 31 is separated from the rotor 32 by the action of the elastic member 36.

Figure 11:
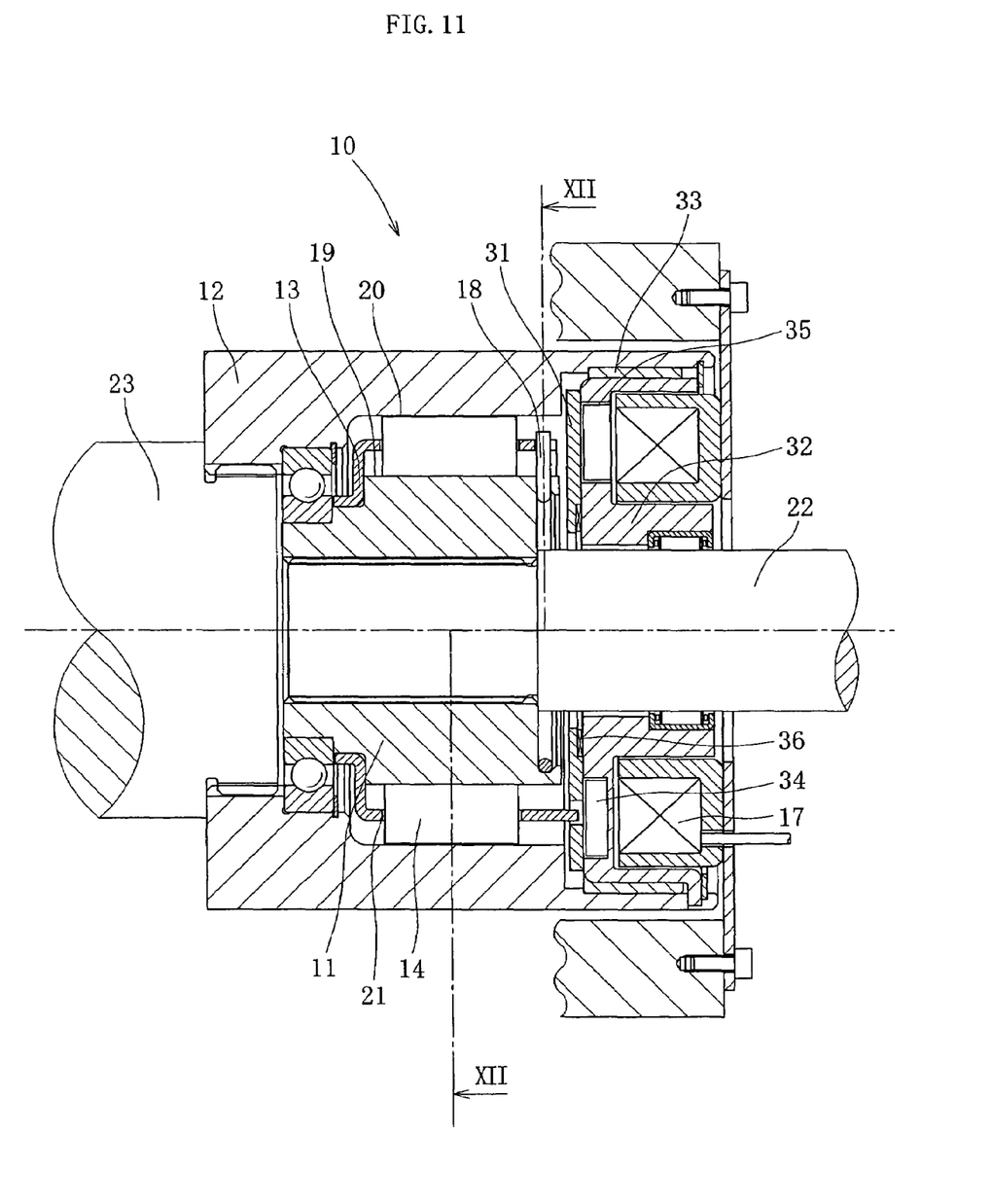
FIG. 11 is a view similar to FIG. 8, but showing a state during clutch operation.
Figure 12:
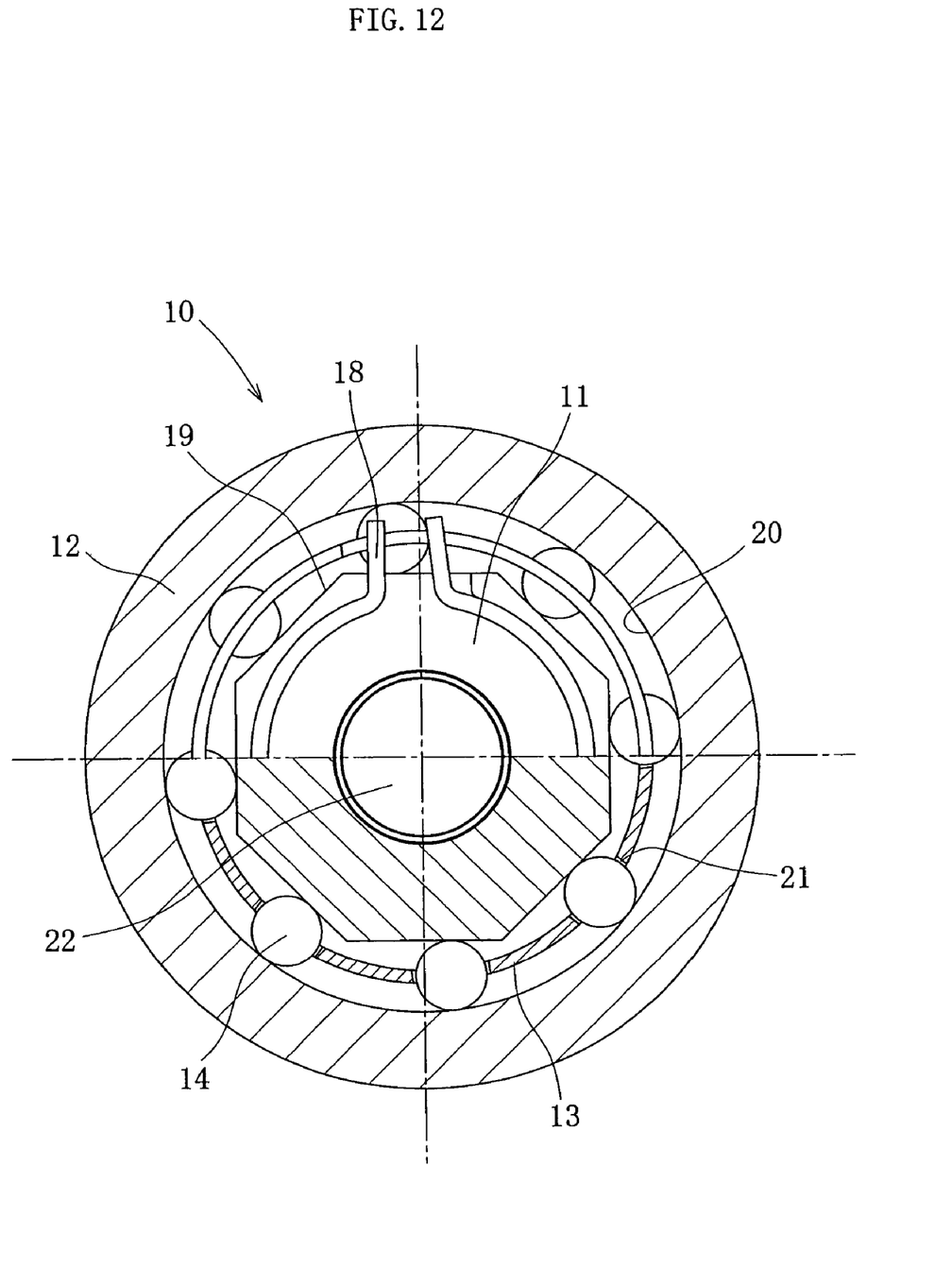
FIG. 12 is a sectional view taken along the line XII-XII in FIG. 11.
Figure 13:
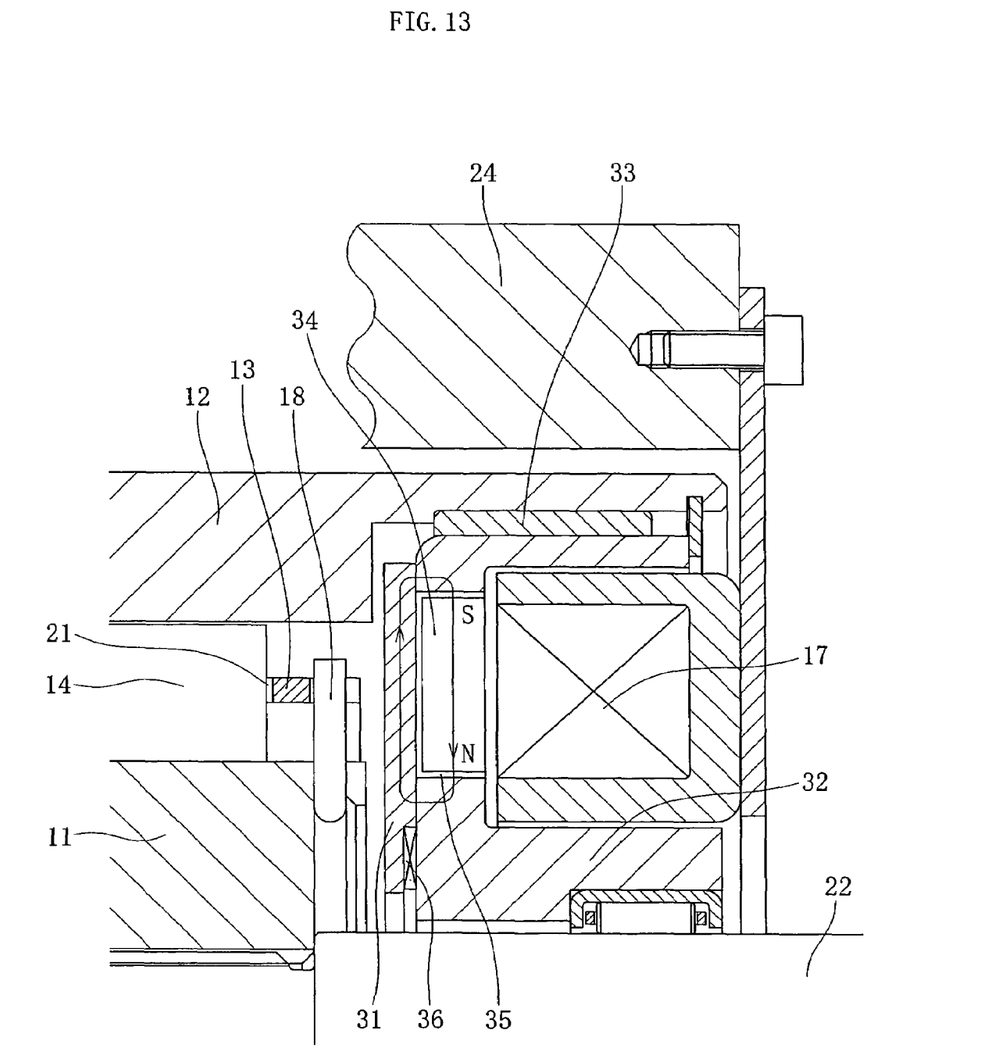
FIG. 13 is the principal enlarged view of FIG. 11.

FIGS. 11, 12 and 13 show a connected state. In this case, the solenoid coil 17 is in the de-energized state, the magnetic flux generated by the permanent magnet 34 passes through the armature 31, as shown by solid arrows in FIG. 13. Thereby, the armature 31 is attracted to the rotor 32, and the armature 31 and rotor 32 are frictionally contacted; thus, the clutch is engaged.

As has been described so far, the first and second embodiments use a reverse action type clutch as a fail-safe mechanism for steer-by-wire systems, such that the energization of the solenoid coil results in the disengaged state and the de-energization of the solenoid coil results in the engaged state. In addition, examples have been given in which the outer ring is formed with a cylindrical surface; and the inner ring is formed with cam surfaces; however, reversely, the inner ring may be formed with a cylindrical surface while forming the outer ring with cam surfaces.

What is claimed is:

1. A steer-by-wire system comprising:
   a first shaft connected to a steering wheel,
   a first motor imparting a steer reaction to the first shaft,
   a second shaft connected to a steering gear,
   a second motor imparting a steer force to the second shaft,
   wherein the second motor is separate and distinct from the first motor, and
   a clutch mounted between the first and second shafts for connecting or disconnecting the first and second shafts, said clutch being normally in the disengaged state, with the steer reaction being imparted from the first motor to the first shaft and the steer force being imparted from the second motor to the second shaft,
   wherein said clutch is composed of a mechanical clutch section, an armature encompassing an outer circumference of the first shaft, and a solenoid coil for controlling said mechanical clutch section, wherein the armature is disposed between an axial end face of the second shaft and the solenoid coil, and wherein the clutch is a reverse actuation type clutch such that when the solenoid coil is in the energized state, the armature moves away from the solenoid coil and toward the axial end face of the second shaft and the mechanical clutch section is in the disengaged state, while when the solenoid coil is in the de-energized state, the armature moves away from the axial end face of the second shaft and toward the solenoid coil, and the mechanical clutch section is in the engaged state.

2. A steer-by-wire system as set forth in claim 1, wherein said clutch comprises
   an inner ring connected to either one of the first and second shafts, and an outer ring connected to the other,
   wedge spaces defined by cam surfaces formed on either one of said inner and outer rings and a cylindrical surface formed on the other, a cage elastically held to a member formed with said cam surfaces in the direction of rotation, engaging elements interposed between said inner and outer rings and held by said cage, an armature movable only axially of said cage, a switching plate movable only axially of the member formed with said cylindrical surface, a rotor fixed to the member formed with said cylindrical surface and opposed to the switching plate, an elastic member for pushing said switching plate away from said rotor and toward said armature, and a solenoid coil which, when energized, moves the switching plate toward the rotor against said elastic member, wherein when the solenoid coil is energized, a clearance is formed between the armature and the switching plate, placing the mechanical clutch section in the disengaged state, and when the solenoid coil is de-energized, the armature and the switching plate are brought into frictional contact with each other by the action of the elastic member, placing the mechanical clutch section in the engaged state.

3. A steer-by-wire system as set forth in claim 1, wherein said clutch comprises an inner ring connected to either one of the first and second shafts, and an outer ring connected to the other, wedge spaces defined by cam surfaces formed on either one of said inner and outer rings and a cylindrical surface formed on the other, a cage elastically held to a member formed with said cam surfaces in the direction of rotation, engaging elements interposed between said inner and outer rings and held by said cage, an armature movable only axially of said cage, a rotor fixed to the member formed with said cylindrical surface and opposed to said armature, an elastic member for pushing said armature away from said rotor, a slit formed in the surface of the rotor opposed to said armature, a permanent magnet and a solenoid coil which are fixed in said slit and move said armature to said rotor by their magnetic fluxes against the elastic member, wherein when the solenoid coil is energized, the attraction force on the armature decreases, the armature is separated from the rotor by the action of the elastic member, and the mechanical clutch section is placed in the disengaged state, while when the solenoid coil is de-energized, the magnetic flux generated from the permanent magnet attracts the armature to the rotor against the elastic member, the armature and rotor are frictionally contacted with each other to place the mechanical clutch section in the engaged state.

4. A steer-by-wire system comprising:

a first shaft connected to a steering wheel, a first motor imparting a steer reaction to the first shaft, a second shaft connected to a steering gear, a second motor imparting a steer force to the second shaft, and a clutch mounted between the first and second shafts for connecting or disconnecting the first and second shafts, said clutch being normally in the disengaged state, with the steer reaction being imparted from the first motor to the first shaft and the steer force being imparted from the second motor to the second shaft, wherein said clutch is composed of a mechanical clutch section, and a solenoid coil for controlling said mechanical clutch section, and is a reverse actuation type clutch such that when the solenoid coil is in the energized state, the mechanical clutch section is in the disengaged state, while when the solenoid coil is in the de-energized state, the mechanical clutch section is in the engaged state, wherein said clutch comprises:

an inner ring connected to either one of the first and second shafts, and an outer ring connected to the other, wedge spaces defined by cam surfaces formed on either one of said inner and outer rings and a cylindrical surface formed on the other, a cage elastically held to a member formed with said cam surfaces in the direction of rotation, engaging elements interposed between said inner and outer rings and held by said cage, an armature movable only axially of said cage, a switching plate movable only axially of the member formed with said cylindrical surface, a rotor fixed to the member formed with said cylindrical surface and opposed to the switching plate, an elastic member for pushing said switching plate away from said rotor and toward said armature, and a solenoid coil which, when energized, moves the switching plate toward the rotor against said elastic member, wherein when the solenoid coil is energized, a clearance is formed between the armature and the switching plate, placing the mechanical clutch section in the disengaged state, and when the solenoid coil is de-energized, the armature and the switching plate are brought into frictional contact with each other by the action of the elastic member, placing the mechanical clutch section in the engaged state.

5. A steer-by-wire system comprising:

a first shaft connected to a steering wheel, a first motor imparting a steer reaction to the first shaft, a second shaft connected to a steering gear, a second motor imparting a steer force to the second shaft, and a clutch mounted between the first and second shafts for connecting or disconnecting the first and second shafts, said clutch being normally in the disengaged state, with the steer reaction being imparted from the first motor to the first shaft and the steer force being imparted from the second motor to the second shaft, wherein said clutch is composed of a mechanical clutch section, and a solenoid coil for controlling said mechanical clutch section, and is a reverse actuation type clutch such that when the solenoid coil is in the energized state, the mechanical clutch section is in the disengaged state, while when the solenoid coil is in the de-energized state, the mechanical clutch section is in the engaged state, wherein said clutch comprises:

an inner ring connected to either one of the first and second shafts, and an outer ring connected to the other, wedge spaces defined by cam surfaces formed on either one of said inner and outer rings and a cylindrical surface formed on the other, a cage elastically held to a member formed with said cam surfaces in the direction of rotation, engaging elements interposed between said inner and outer rings and held by said cage, an armature movable only axially of said cage, a rotor fixed to the member formed with said cylindrical surface and opposed to said armature, an elastic member for pushing said armature away from said rotor, a slit formed in the surface of the rotor opposed to said armature, a permanent magnet and a solenoid coil which are fixed in said slit and move said armature to said rotor by their magnetic fluxes against the elastic member, wherein when the solenoid coil is energized, the attraction force on the armature decreases, the armature is separated from the rotor by the action of the elastic member, and the mechanical clutch section is placed in the disengaged state, while when the solenoid coil is de-energized, the magnetic flux generated from the permanent magnet attracts the armature to the rotor against the elastic member, the armature and rotor are frictionally contacted with each other to place the mechanical clutch section in the engaged state.

6. A steer-by-wire system as set forth in claim 1, wherein the first motor is disposed directly between the steering wheel and the clutch and the second motor is disposed directly between the clutch and the steering gear.

7. A steer-by-wire system as set forth in claim 1, wherein the first motor is a reaction simulator and the second motor is a steering actuator.

8. A steer-by-wire system as set forth in claim 1, further comprising a controller directly connected to each of the first motor, clutch, and second motor for transmitting a control signal thereto.

* * * * *